(12) United States Patent
Hosaka et al.

(10) Patent No.: US 7,900,997 B2
(45) Date of Patent: Mar. 8, 2011

(54) VEHICLE UPPER BODY STRUCTURE

(75) Inventors: Nobuo Hosaka, Wako (JP); Kazuki Maeshima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/375,462

(22) PCT Filed: Aug. 5, 2008

(86) PCT No.: PCT/JP2008/064384
§ 371 (c)(1), (2), (4) Date: Feb. 9, 2009

(87) PCT Pub. No.: WO2009/020224
PCT Pub. Date: Feb. 12, 2009

(65) Prior Publication Data
US 2010/0127532 A1    May 27, 2010

(30) Foreign Application Priority Data
Aug. 6, 2007    (JP) .................. 2007-204300

(51) Int. Cl.
*B60N 99/00*    (2006.01)

(52) U.S. Cl. .................................................. 296/193.12
(58) Field of Classification Search ............. 296/187.01, 296/194.04, 193.06, 203.01, 193.04, 203.13, 296/187.13, 193.12
See application file for complete search history.

(56) References Cited

U.S. PATENT DOCUMENTS
2007/0200314 A1    8/2007    Anderson et al.

FOREIGN PATENT DOCUMENTS
DE    101 00 325    7/2007
JP    2005-153649    6/2005

*Primary Examiner* — Lori L Lyjak
(74) *Attorney, Agent, or Firm* — Rankin, Hill & Clark LLP (57) ABSTRACT

A vehicle upper body structure includes an inner member and an outer member assembled together to form a roof side rail, a pillar and a roof cross rail joined together at a junction. The junction includes an inverted U-shaped reinforcement bracket having two legs joined to the inner member and a central web extending between the legs, and a reinforcement panel disposed between the inner and outer members and retained on an upper surface of the central web of the reinforcement bracket. The outer member is joined to an upper surface of the reinforcement panel.

20 Claims, 12 Drawing Sheets

VEHICLE UPPER BODY STRUCTURE

TECHNICAL FIELD

The present invention relates to a vehicle upper body structure suitable for use in an upper part of the vehicle body including a roof.

BACKGROUND ART

Roofs of the vehicles generally include a skeleton frame and a roof panel formed from a sheet metal and attached to the skeleton frame. One example of known vehicle roof structures is shown in Japanese Patent Laid-open Publication (JP-A) No. 2005-153649.

Figure 13:
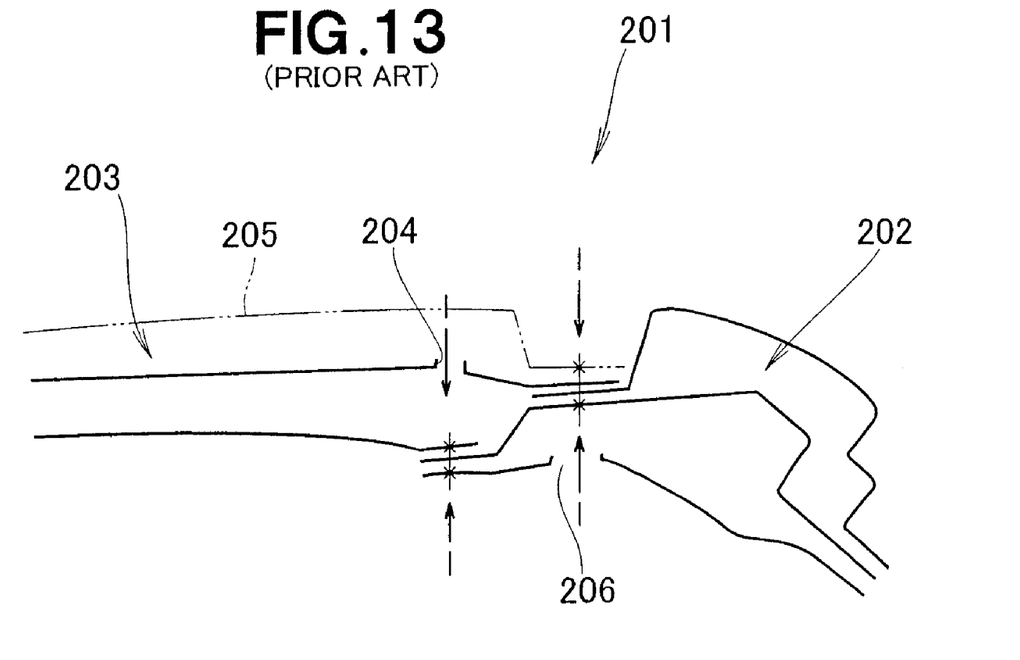
FIG. 13 is a diagrammatical view showing the general construction of a conventional vehicle roof structure.

The disclosed vehicle roof structure, as shown in FIG. 13 hereof, includes a side roof rail 202, a center roof rail 203 and a roof panel 205 joined together by spot welding. The side roof rail 202 and the center roof rail 203 have a closed cross-sectional configuration to improve the stiffness of the vehicle body against a side or lateral collision. The center roof rail 203 of closed cross-sectional configuration has a first access hole 204 to allow access of a welding electrode (not shown) to a weld spot when the center roof rail 203 and the side roof rail 202 are to be welded together. Similarly, the side roof rail 202 of closed cross-sectional configuration has a second access hole 206 to allow access of another welding electrode (not shown) to a weld spot when the roof panel 205, the center roof rail 203 and the side roof rail 202 are to be welded together.

The vehicle roof structure 201 of the foregoing construction is not fully satisfactory in that the access holes 204, 206 lower the strength of the vehicle roof structure 201.

It is accordingly an object of the present invention to provide a vehicle upper body structure, which has relatively high stiffness and strength, and is able to insure stable one-sided spot welding operation with less variation in the welded position.

DISCLOSURE OF THE INVENTION

According to the present invention, there is provided a vehicle upper body structure comprising an inner member and an outer member assembled together to form a roof side rail, a pillar and a roof cross rail joined together at a junction. The junction includes an inverted U-shaped reinforcement bracket having two legs and a central web extending between the legs, the legs being joined to the inner member, and a reinforcement panel disposed between the inner member and the outer member and retained on an upper surface of the central web of the reinforcement bracket, the outer member being joined to an upper surface of the reinforcement panel.

The inverted U-shaped reinforcement bracket increases the stiffness and strength of the junction and is also able to withstand a load or pressure applied from a single-sided welding gun to a weld spot during single-sided resistance spot welding operation. Thus, the reinforcement panel and the outer member can be retained stably on the central web of the reinforcement bracket without causing downward yielding or deformation during the single-sided resistance spot welding operation. This will ensure formation of good-quality nuggets at accurate weld spots, leading to an improvement in the quality of the vehicle body. Furthermore, since the roof side rail, the pillar and the roof cross rail are joined together at the junction 48 without requiring electrode access holes formed therein, the stiffness and strength of the vehicle upper body structure do not decrease.

In one preferred form of the present invention, the inverted U-shaped reinforcement bracket has an axis aligned with a longitudinal direction of a vehicle body. The outer member and the reinforcement panel have a spot-welded joint portion, and either of the two legs has a base portion disposed adjacent to the spot-welded joint portion. This arrangement enables the reinforcement bracket to effectively bear or retain the pressure applied to a weld spot when during the one-sided resistance spot welding operation.

The vehicle upper body structure may further include a stiffener disposed between and assembled with the inner and outer members, wherein the reinforcement panel is formed as an integral part of the stiffener and joined to the upper surface of the central web of the reinforcement bracket. By thus joining the central web of the reinforcement bracket and the stiffener, the strength of the junction is increased.

In another preferred form of the present invention, the inverted U-shaped reinforcement bracket has an axis aligned with a widthwise direction of a vehicle body. Preferably, the reinforcement bracket further has a pair of reinforcement stays extending along distal ends of the two legs, respectively, and the reinforcement panel and the outer member have a spot-welded joint portion. Either of the reinforcement stays has an end portion disposed adjacent to the spot-welded joint portion. The thus arranged reinforcement stays ensures that the inverted U-shaped reinforcement bracket can withstand a load or pressure applied from a single-sided welding gun or electrode to a weld spot during the single-sided resistance spot welding operation.

In one preferred form of the present invention, wherein the roof side rail includes a roof side rail inner and a roof side rail outer assembled with the roof side rail inner, the pillar includes a pillar inner and a pillar outer assembled with the pillar inner, and the roof cross rail includes a roof cross rail inner and a roof cross rail outer assembled with the roof cross rail inner. The roof side rail inner, the pillar inner, and the roof cross rail inner form different parts of the inner member. The roof side rail outer, the pillar outer, and the roof cross rail outer form different parts of the outer member. The legs of the reinforcement bracket are joined to the pillar inner of the pillar, the reinforcement panel is disposed between the pillar inner and the roof cross rail outer and also between the pillar inner and the roof side rail outer, and the roof cross rail outer and the roof side rail outer are joined to the upper surface of the reinforcement panel.

Preferably, the roof side rail further includes a side rail stiffener disposed between and assembled with the roof side rail inner and the roof side rail outer, and the reinforcement panel is formed as an integral part of the side rail stiffener. The reinforcement panel is preferably joined to the upper surface of the central web of the reinforcement bracket.

Preferably, the reinforcement panel and the roof cross rail outer have a first spot-welded joint portion, one of the legs of the reinforcement bracket has a base portion disposed adjacent to the first spot-welded joint portion, the reinforcement panel and the roof side rail outer have a second spot-welded joint portion, and the other leg of the reinforcement bracket has a base portion disposed adjacent to the second spot-welded joint portion.

In another preferred form of the present invention, one of the legs of the reinforcement bracket is joined to the roof side rail inner, and the other leg of the reinforcement bracket is joined to the pillar inner. The reinforcement panel is disposed between the roof side rail inner and the roof cross rail outer and also between the pillar inner and the roof cross rail outer, and the roof cross rail outer, the roof side rail outer and the pillar outer are joined to the upper surface of the reinforcement panel.

Preferably, the roof side rail further includes a side rail stiffener disposed between and assembled with the roof side rail inner and the roof side rail outer, the side rail stiffener having an integral portion forming one part of the reinforcement panel. The pillar further includes a pillar stiffener disposed between and assembled with the pillar inner and the pillar outer, the pillar stiffener having an integral portion forming another part of the reinforcement panel. The reinforcement panel is preferably joined to the upper surface of the central web of the reinforcement bracket.

Preferably, the reinforcement bracket further has a pair of reinforcement stays extending along distal ends of the two legs, respectively, the reinforcement panel and the roof side rail outer have a first spot-welded joint portion, and the reinforcement panel and the pillar outer have a second spot-welded joint portion. One of the reinforcement stays has an end portion disposed adjacent to the first spot-welded joint portion, and the other reinforcement stay has an end portion disposed adjacent to the second spot-welded joint portion.

DETAILED DESCRIPTION OF THE PREFERRED EMBODIMENTS

Certain preferred embodiments of the present invention will be described below in greater detail with reference to the accompanying sheets of drawings.

Figure 1:
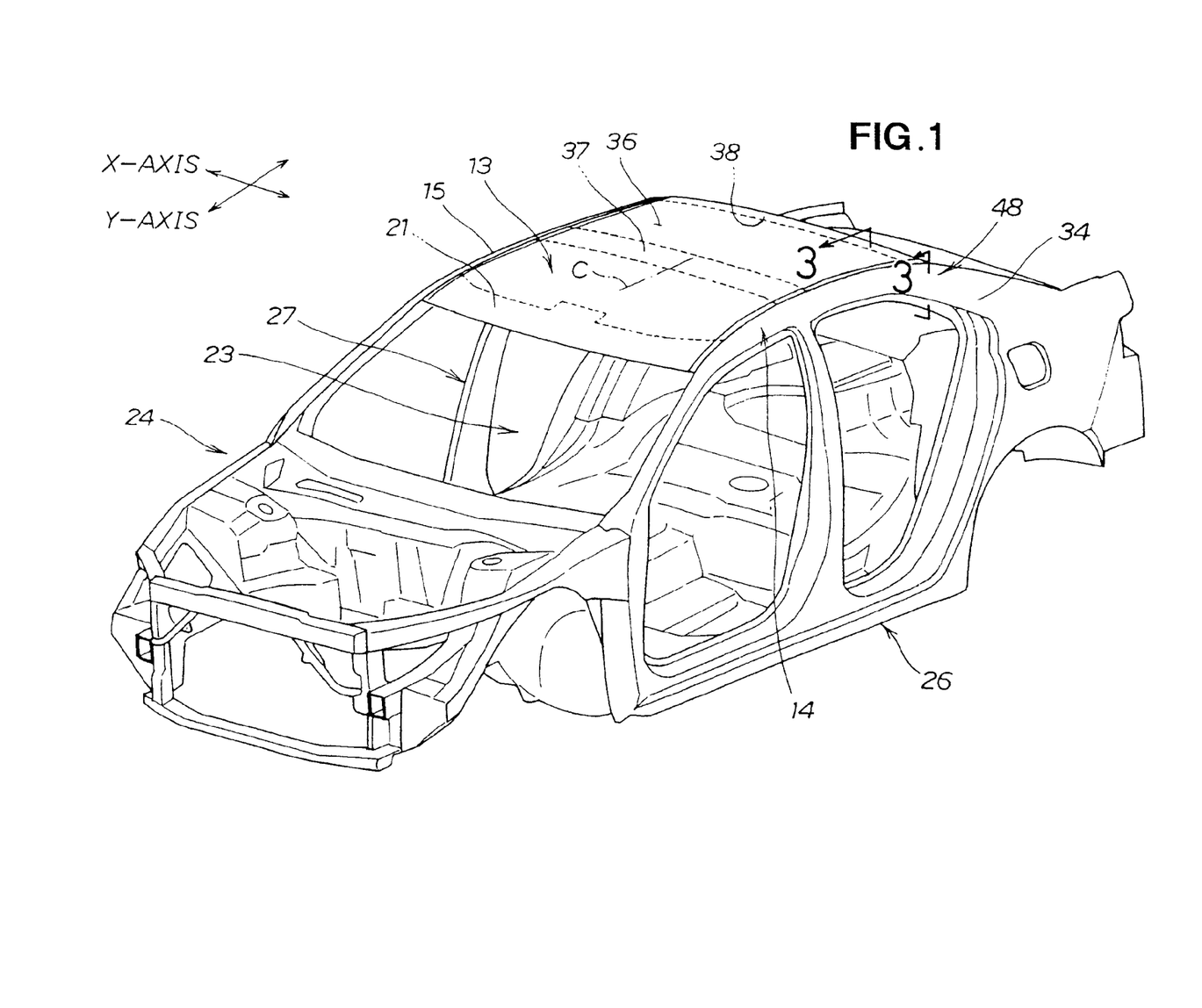
FIG. 1 is a perspective view of a vehicle body in white stage including an upper body structure according to a first embodiment of the present invention.
Figure 2:
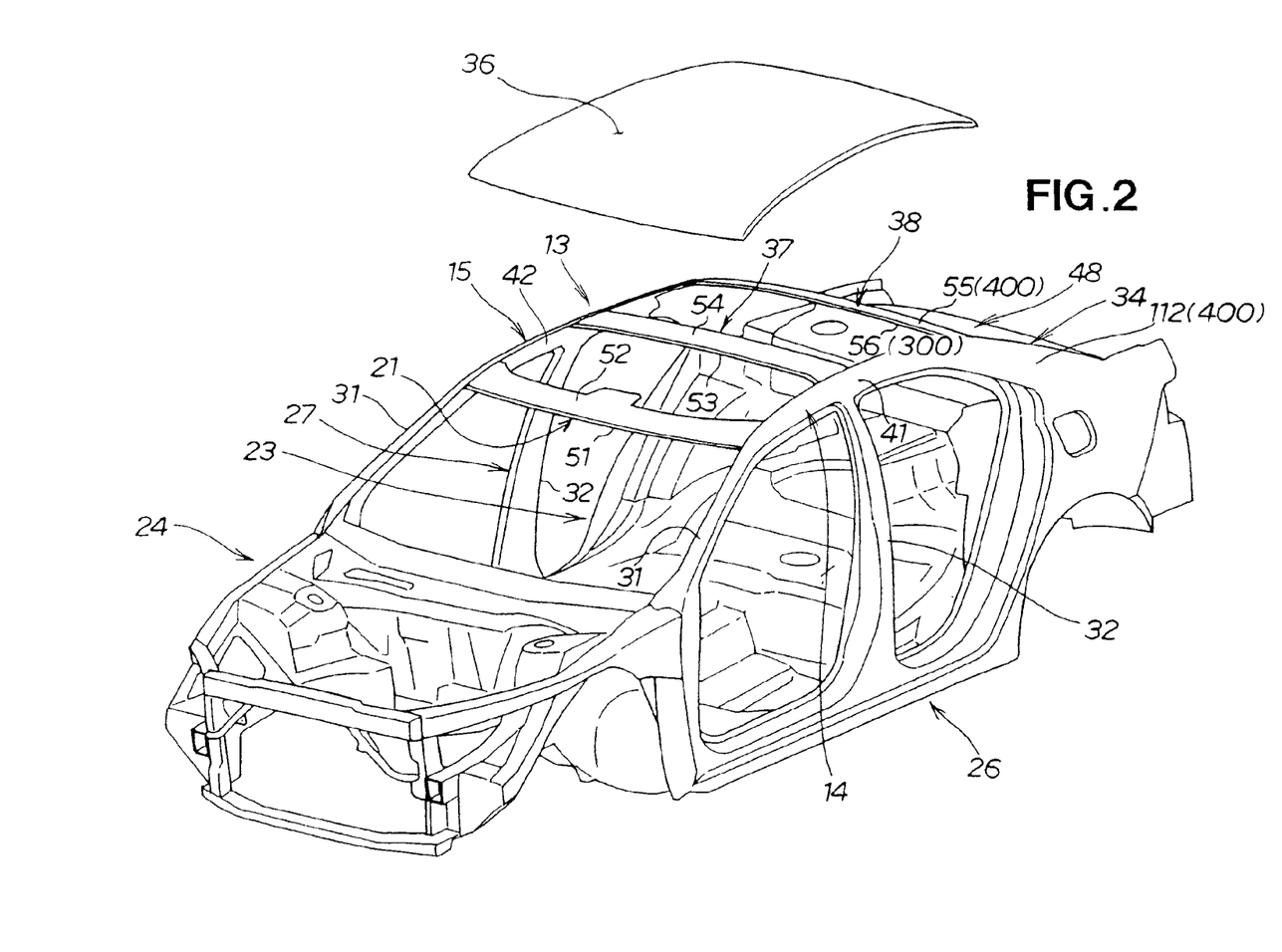
FIG. 2 is a view similar to FIG. 1, but showing the vehicle body with a roof panel removed for clarity.

FIGS. 1 and 2 show in perspective a vehicle body in white (BIW) including an upper body structure according to a first embodiment of the present invention. As shown in FIG. 1, the vehicle body 24 has a passenger compartment 23, a left side body structure 26 forming a left wall of the passenger compartment 23, a right side body structure 27 forming a right wall of the passenger compartment 23, and a roof 13 forming a top wall of the passenger compartment 23. The left and right side body structures 26 and 27 are symmetrical with each other about a longitudinal central axis C (Y-axis) of the vehicle body 24, and a description will be made mainly to the left side body structure 26.

As shown in FIG. 2, the left side body structure 26 includes a front pillar 31, a center pillar 32 and a rear pillar 34 that are connected together at upper ends thereof by a roof side rail 14 which forms a part of the roof 13. The rear pillar 38 includes a rear pillar outer 112 and a rear pillar inner 121 (FIG. 3) assembled with the rear pillar outer 112. Though not designated by reference characters, the front and center pillars 31, 32 are also composed of a pillar outer and a pillar inner assembled together.

The roof 13 includes the left roof side rail 14, a right roof side rail 15, a front roof cross rail 21, a center roof cross rail 37, a rear roof cross rail 38, and a roof panel 36. The left and right roof side rails 14 and 15 extend in the longitudinal direction (Y-axis direction shown in FIG. 1) of the vehicle body 24, and the front, center and rear roof cross rails 21, 37 and 38 extend crosswise between the left and right roof side rails 14 and 15. The direction in which these three roof cross rails 21, 37, 38 extend is a widthwise direction of the vehicle body 24, which corresponds to the X-axis direction shown in FIG. 1.

The left and right roof side rails 14, 15 each have a roof side rail outer 41 (only the left side one being shown in FIG. 2) and a roof side rail inner 42 (only the right side one being shown in FIG. 2) assembled with the left roof side rail outer 41.

The front roof cross rail 21 includes a front roof cross rail inner 51 and a front roof cross rail outer 52 assembled with the front roof cross rail inner 51. The front roof cross rail 21 is connected at opposite ends to the left and right roof side rails 14 and 15. Similarly, the center roof cross rail 37 includes a center roof cross rail inner 53 and a center roof cross rail outer 54 assembled with the center roof cross rail inner 53. The center roof cross rail 37 is connected at opposite ends to the left and right roof side rails 14 and 15. The rear roof cross rail 38 includes a rear roof cross rail inner 56 and a rear roof cross rail outer 55 assembled with the rear roof cross rail inner 56. The rear roof cross rail 38 is connected at opposite ends to the left and right roof side rails 14 and 15.

The roof side rail 14, the rear pillar 34 and the rear roof cross rail 38 are joined together at a junction 48, which forms an important part of the vehicle upper body structure according to the present invention.

Figure 3:
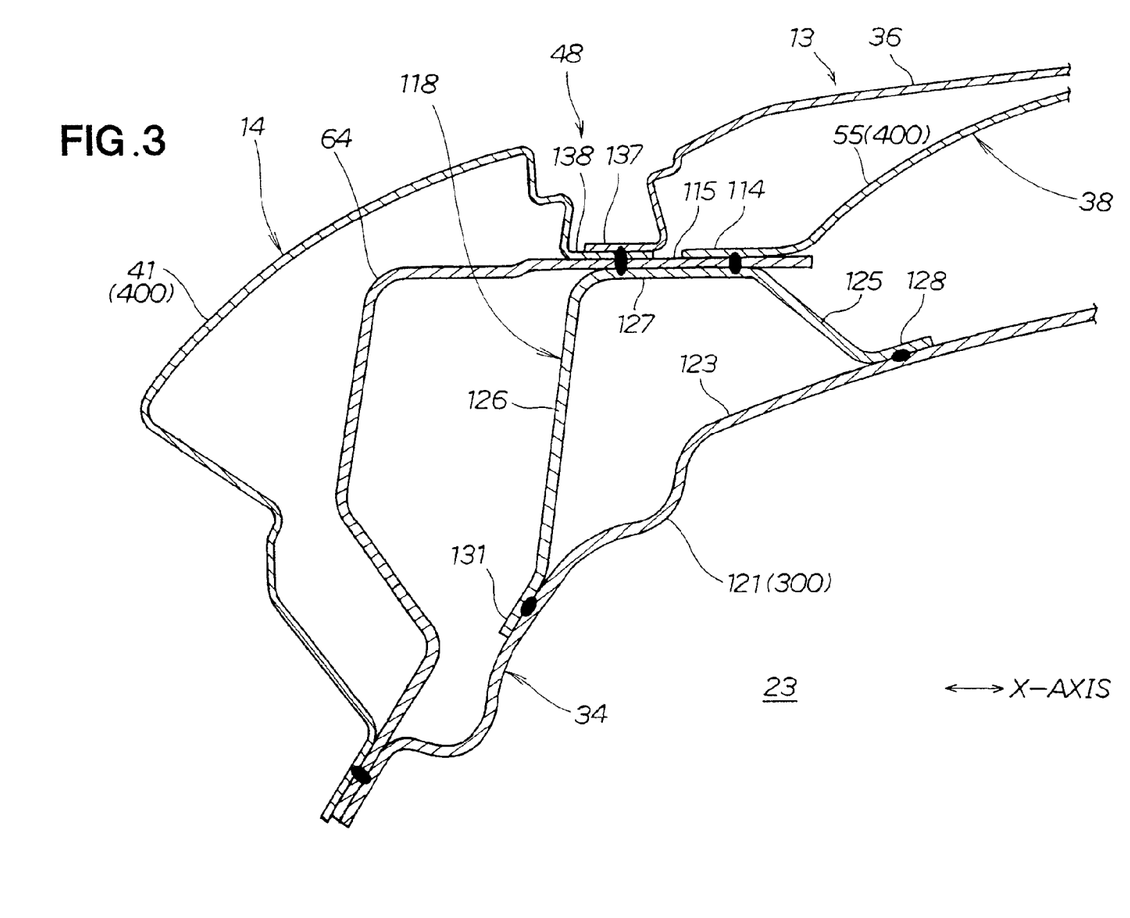
FIG. 3 is a cross-sectional view taken along line 3-3 of FIG. 1, showing the upper body structure.

As shown in FIG. 3, the junction 48 between the roof side rail 14, the rear pillar 34 and the rear roof cross rail 38 includes a generally inverted U-shaped reinforcement bracket 118 and a reinforcement panel 115 that are disposed between an inner member 300 and an outer member 400 assembled together to form the roof side rail 14, the rear pillar 34 and the rear roof cross rail 38 joined together at the junction 48.

More specifically, the inverted U-shaped reinforcement bracket 118 has two legs 125, 126 and a central web 127 extending between the legs 125, 126. The inverted U-shaped reinforcement bracket 118 has an axis aligned with the longitudinal direction (Y-axis direction) of the vehicle body 24, which is perpendicular to the X-axis direction. The legs 125, 126 are joined to an outer surface 123 of the rear pillar inner 121 of the rear pillar 38. The first leg 125 has a welding flange 128 formed integrally with a distal end thereof and joined by spot welding to the rear pillar inner 121. Similarly, the second leg 126 has a welding flange 131 formed integrally with a distal end thereof and joined by spot welding to the rear pillar inner 121. The central web 127 has an upper surface facing upward.

The reinforcement panel 115 is placed flat on the upper surface of the central web 127 of the inverted U-shaped reinforcement bracket 118. In the illustrated embodiment, the reinforcement panel 118 is formed as an integral part of a side rail stiffener 64, which is disposed between and assembled with the roof side rail outer 41 and the roof side rail inner 42 (FIG. 2) so as to reinforce the roof side rail 14.

As shown in FIG. 3, the rear roof cross rail outer 55 of the rear roof cross rail 38 has a welding flange 114 laid flat on an upper surface of the reinforcement panel 115. The welding flange 114 of the rear roof cross rail outer 55, the reinforcement panel 115 and the central web 127 of the reinforcement bracket 118 are joined together by spot welding. The welding may be done in such a manner as to join only the welding flange 114 of the rear roof cross rail outer 55 and the reinforcement panel 115 in which instance the reinforcement panel 115 is retained on the upper surface of the central web 127 of the reinforcement bracket 118. The roof side rail outer 41 has a welding flange 138 placed flat on the upper surface of the reinforcement panel 115, and the roof panel 36 has a welding flange 137 placed flat on an upper surface of the welding flange 138 of the roof side rail outer 41. The welding flange 137 of the roof panel 36, the welding flange 138 of the roof side rail outer 41, the reinforcement panel 115 and the central web 127 of the reinforcement bracket 118 are joined by spot welding. The welding may be done in such a manner as to join only the welding flange 137 of the roof panel 36 and the welding flange 138 of the roof side rail outer 41.

The rear roof cross rail outer 55 of the rear roof cross rail 38 forms one part of the outer member 400 of the vehicle upper body structure according to the invention, and the roof side rail outer 41 of the roof side rail 14 forms another part of the outer member 400. The rear pillar inner 121 forms one part of the inner member 300 of the vehicle upper body structure of the present invention. At the junction 48, the roof side rail 14 and the rear pillar 34 are assembled together to form a lap joint, where the roof side rail outer 41 overlaps the rear pillar inner 121. The roof side rail 14 and the rear pillar 34 may be arranged to form a butt joint in which instance the legs 125, 126 of the reinforcement bracket 118 extend across the butt joint between the roof side rail inner 41 (FIG. 2) of the roof side rail 14 and the rear pillar inner 121 of the rear pillar 34.

In FIG. 3, nuggets formed by spot welding are shown by solid black ellipses. As shown in this figure, the first leg 125 has a base portion disposed adjacent to a nugget (or a spot-welded joint portion) between the central web 127 of the reinforcement bracket 118, the reinforcement panel 115 and the rear roof cross rail outer 55. Similarly, a base portion of the second leg 126 is disposed adjacent to a nugget (or a spot-welded joint portion) between the roof panel 36, the roof side rail outer 41, the reinforcement panel 115 and the central web 127 of the reinforcement bracket 118.

Operation of the vehicle upper body structure including the junction 48 according to the first embodiment of the present invention will be described below in conjunction with spot welding operation. The spot welding operation is achieved by a single-sided resistance spot welding (RSW) system that can make a weld using single-sided access with low electrode force. As is generally known to the art, the single-sided RSW system has a single-sided welding gun (electrode) movable to access a weld spot from only one side of the work (vehicle body 24) and a ground plate or shoe attached to the vehicle body.

Figure 4:
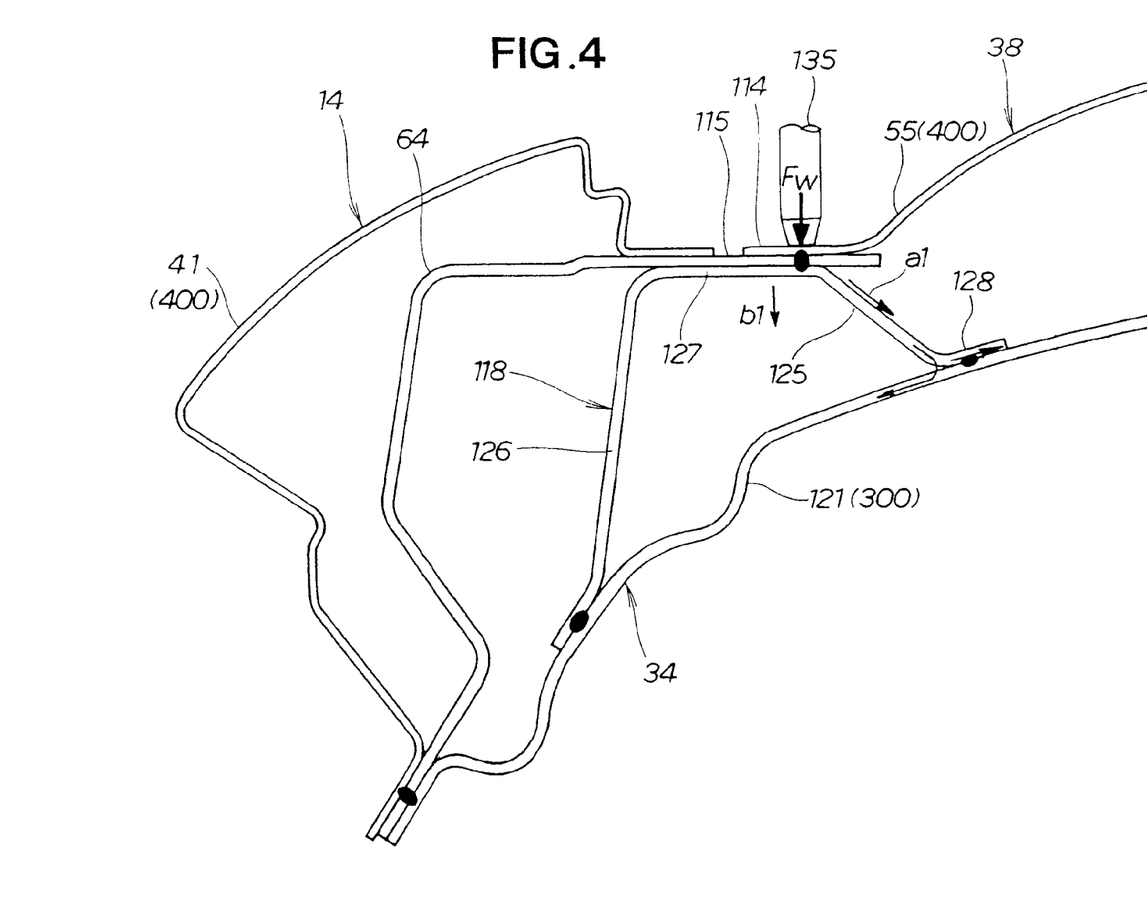
FIG. 4 is a diagrammatical view illustrative of the operation of the upper body structure when a roof cross rail is joined by spot welding.

As shown in FIG. 4, with the reinforcement panel 115 (which is formed as an integral part of the side rail stiffener 64) being placed or retained on an upper surface of the central web 127 of the inverted U-shaped reinforcement bracket 118, the welding flange 114 of the rear roof cross rail outer 55 of the rear roof cross rail 38 is placed on the reinforcement panel 115. Then, the single-sided welding gun (electrode) 135 is forced at a predetermined force or pressure Fw against an upper surface of the welding flange 114 of the rear roof cross rail outer 55 while the ground plate (not shown) is connected to the vehicle body 24 (FIG. 2). In this instance, because the base portion of the first leg 125 of the inverted U-shaped reinforcement bracket 118 is disposed adjacent to a weld spot, the pressure Fw applied from the single-sided welding gun 135 is efficiently transmitted through the first leg 125 to the rear pillar inner 121 of the rear pillar 34, as indicated by the arrows "a1". Thus, the reinforcement bracket 118 can retain the reinforcement panel 115 and the welding flange 114 of the rear roof cross rail outer 55 stably in position against displacement and downward deformation (in a direction indicated by arrow "b1") during spot welding operation.

In a first stage of the spot welding operation described above, the welding flange 114 of the rear roof cross rail outer 55, the reinforcement panel 115 and the central web 127 of the reinforcement bracket 118 are welded together. As previously described, the welding operation may be performed in such a manner to join only the welding flange 114 and the reinforcement panel 115 in which instance the reinforcement panel 115 is retained on but not joined to the upper surface of the central web 127 of the reinforcement bracket 118.

Figure 5:
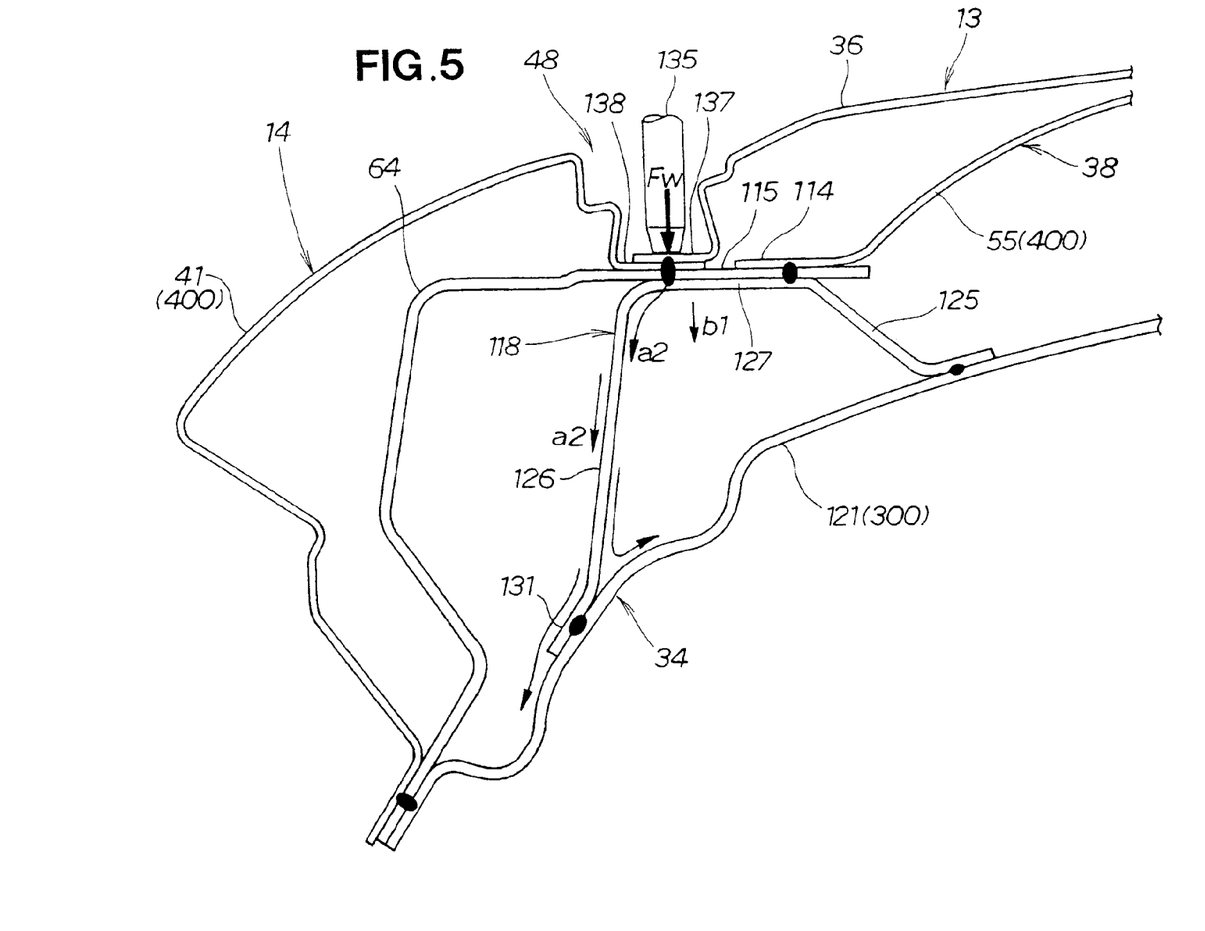
FIG. 5 is a diagrammatical view illustrative of the operation of the upper body structure when a roof panel is joined by spot welding.

Subsequently, as shown in FIG. 5, with the welding flange 138 of the roof side rail outer 41 of the roof side rail 14 being placed on the upper surface of the reinforcement panel 155, the welding flange 137 of the roof panel 36 is placed on an upper surface of the welding flange 138 of the roof side rail outer 41. Thereafter, the single-sided welding gun (electrode) 135 is forced at the predetermined force or pressure Fw against an upper surface of the welding flange 137 of the roof panel 36 while the ground plate (not shown) is connected to the vehicle body 24 (FIG. 2). In this instance, because the base portion of the second leg 126 of the inverted U-shaped reinforcement bracket 118 is disposed adjacent to a weld spot and because the second leg 126 extends substantially parallel to the direction of the pressure Fw, the pressure Fw applied from the single-sided welding gun 135 is substantially directly transmitted to the second leg 126 and then through the second leg 126 the pressure Fw is distributed to the rear pillar inner 121 of the rear pillar 34, as indicated by the arrows "a2". Thus, the reinforcement bracket 118 can retain the reinforcement panel 115 and the welding flange 114 of the roof side rail outer 41 and the welding flange 137 of the roof panel 36 stably in position against displacement and downward deformation (in the direction of arrow "b1") during spot welding operation.

In a second stage of the spot welding operation just described above, the welding flange 137 of the roof panel 36, the welding flange 138 of the roof side rail outer 41, the reinforcement panel 115 and the central web 127 of the reinforcement bracket 118 are welded together. As previously described, the welding operation may be performed in such a manner as to join only the welding flange 137 of the roof panel 36 and the welding flange 138 of the roof side rail outer 41 in which instance the welded flanges 137, 138 are merely retained on the reinforcement panel 115 but not joined to the reinforcement panel 115.

It will be appreciated that the inverted U-shaped reinforcement bracket 118, as it is attached at its legs 125, 126 to the rear pillar inner 121 (inner member 300), has a closed cross-section. The closed-section reinforcement bracket 118, which is disposed at a junction 48 where the roof side rail 14, the rear pillar 34 and the rear roof cross rail 38 are joined together by a single-sided spot welding technique, is able to withstand a load or pressure applied from the single-sided welding gun 135 to a weld spot. Accordingly, the reinforcement panel 115 and the welding flange 114 of the rear roof cross rail outer 55 (outer member 400) can be retained stably on the central web 127 of the reinforcement bracket 118 without causing downward yielding or deformation during spot welding operation. Similarly, the welding flange 137 of the roof panel 36, the welding flange 138 of the roof side rail outer 41 (outer member 400) and the reinforcement panel 115 can be retained stably on the central web 127 of the reinforcement bracket 118 without causing downward yielding or deformation. This will ensure formation of good-quality nuggets at accurate weld spots, leading to an improvement in the quality of the vehicle body 24. Furthermore, since the roof side rail 14, the rear pillar 34 and the rear roof cross rail 38 are joined together at the junction 48 without requiring electrode access holes formed therein, the stiffness and strength of the vehicle body 24 do not decrease.

Figure 6:
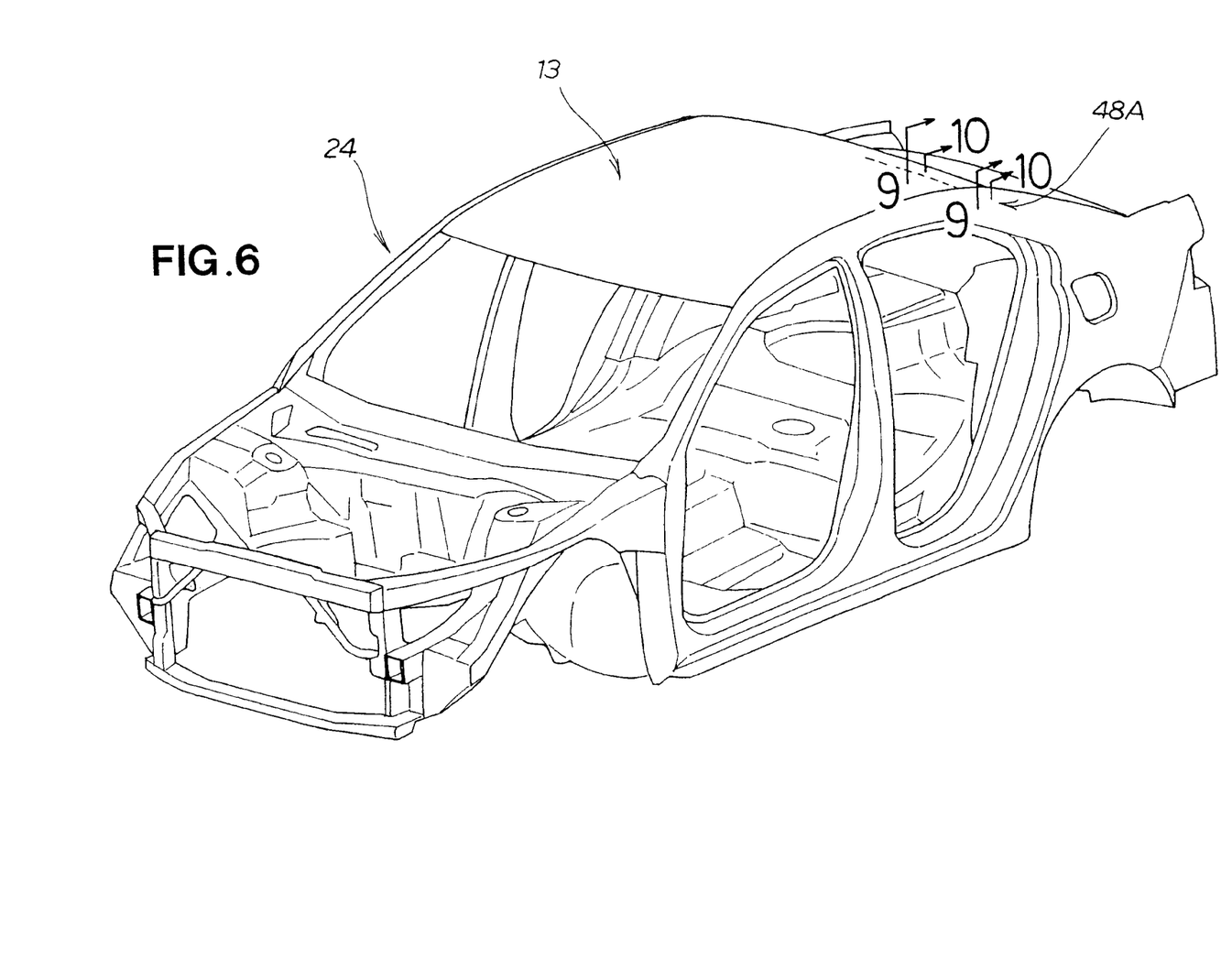
FIG. 6 is a perspective view of a vehicle body in white stage including an upper body structure according to a second embodiment of the present invention.
Figure 7:
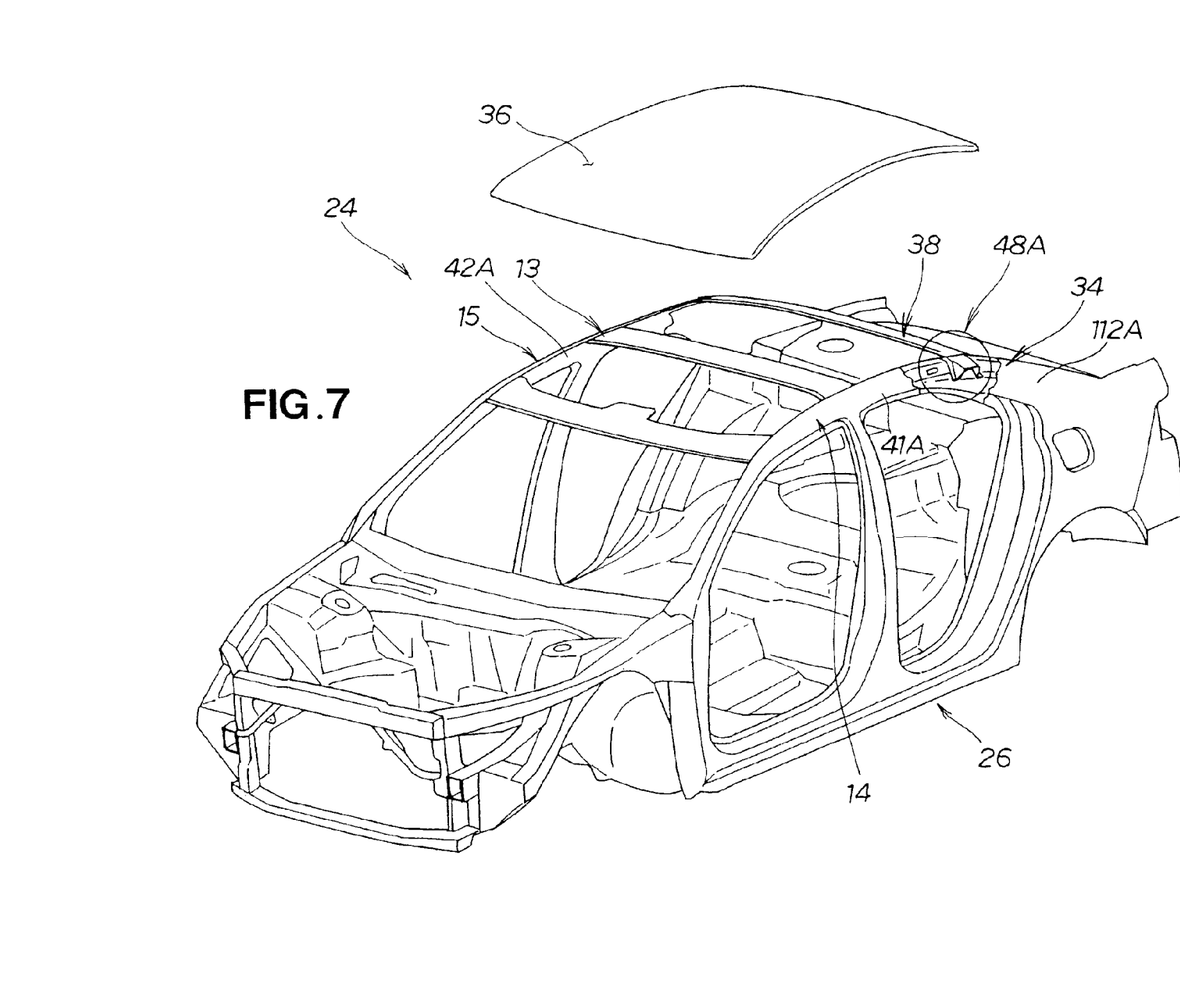
FIG. 7 is a view similar to FIG. 6, but showing the vehicle body with a roof removed and with part cutaway for clarity.
Figure 8:
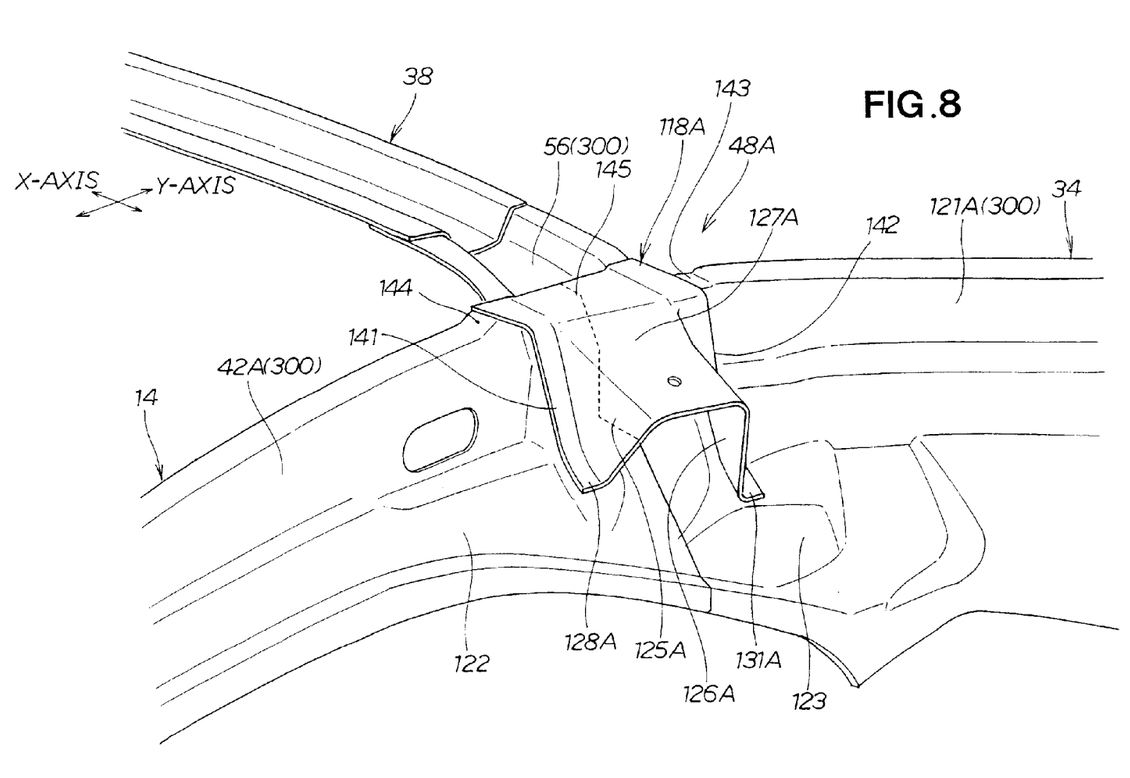
FIG. 8 is a perspective view of a portion indicated by a circle shown in FIG. 7.

FIGS. 6 through 8 inclusive show a vehicle upper body structure including a junction 48A according to a second embodiment of the present invention. The vehicle upper body structure differs from that of the first embodiment in that the junction 48A includes an inverted U-shaped reinforcement bracket 118A (FIG. 8) disposed with its axis aligned with the widthwise direction (X-axis direction) of the vehicle body 24, and the roof side rail 14 and the rear pillar 34 are assembled together to form a butt joint. Due to the structural similarity, these parts, which are like or corresponding to those in the first embodiment, are designated by the same reference characters and further description thereof can be omitted.

As shown in FIG. 8, the inverted U-shaped reinforcement bracket 118A has a first leg 125A joined by welding to an upper surface of a roof side rail inner 42a of the roof side rail 14, and a second leg 126A joined by welding to an upper surface 123 of a rear pillar inner 121A of the rear pillar 34. The rear roof cross rail 38 has a rear roof cross rail inner 56 connected to the roof side rail inner 42A and the rear pillar inner 121A at a position corresponding to the butt joint between the roof side rail 14 and the rear pillar 34. The roof side rail inner 42A, the rear pillar inner 121A and the rear roof cross rail inner 56 form different parts of an inner member 300 of the vehicle upper body structure.

A central web 127 extending between the first and second legs 125A, 126A of the reinforcement bracket 118A has an end (left end in FIG. 8) enlarged to form an integral welding flange 145 lying flat on welding flanges 144, 143 of the roof side rail inner 42A and rear pillar inner 121A. The inverted U-shaped reinforcement bracket 118A further has a pair of reinforcement stays 141, 142 extending along the length of distal ends of the first and second legs 125A and 126A, respectively. The reinforcement stays 141, 142 extend obliquely between the welding flange 145 of the central web 127A and welding flanges 128A, 131A of the first and second legs 125A, 126A, respectively, which are formed as an integral part of the reinforcement stays 141, 142.

Figure 9:
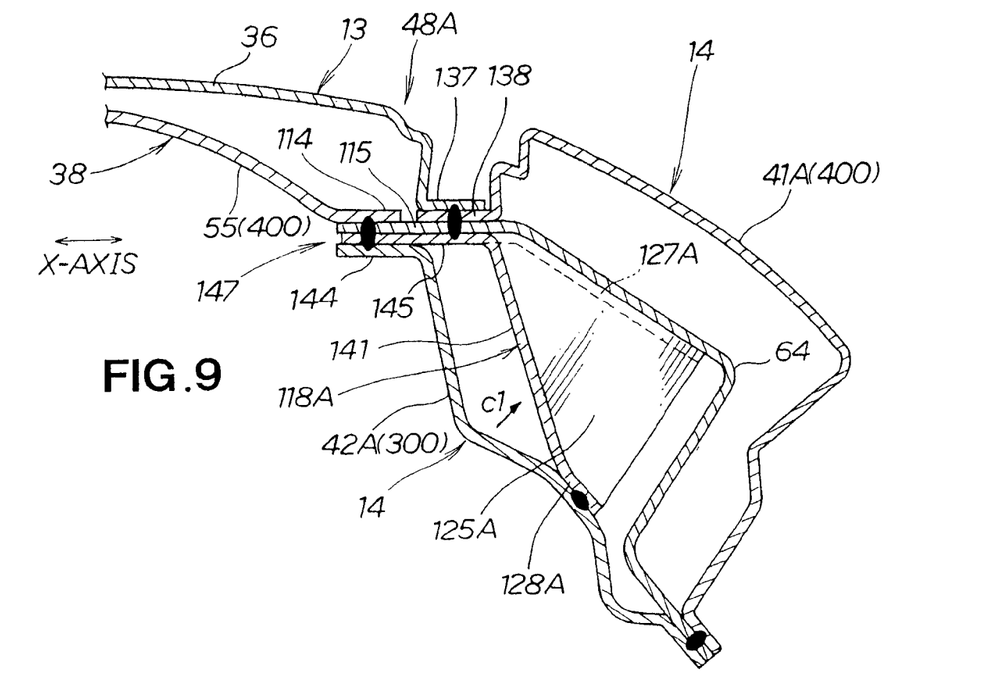
FIG. 9 is a cross-sectional view taken along line 9-9 of FIG. 6.
Figure 10:
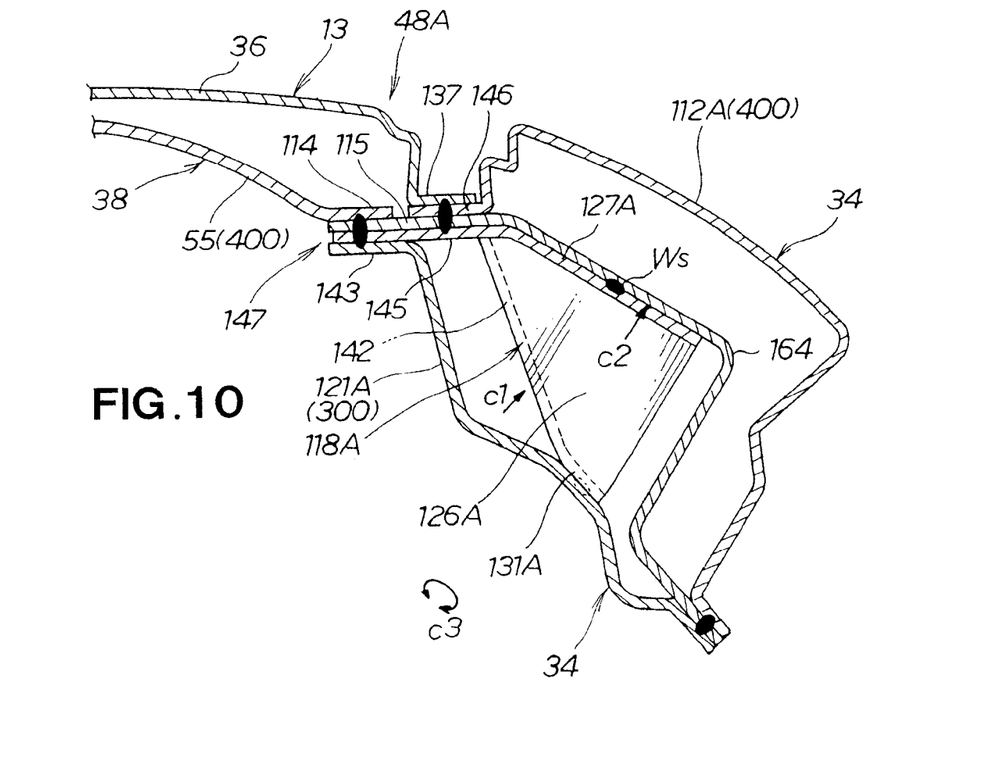
FIG. 10 is a cross-sectional view taken along line 10-10 of FIG. 6.

FIG. 9 is a cross-sectional view taken along line 9-9 of FIG. 6, showing the junction 48A cut along a vertical plane lying immediately in front of the first leg 125A of the reinforcement bracket 118A as viewed from the front end of the vehicle body 24 (FIG. 6). FIG. 10 is a cross-sectional view taken along line 10-10 of FIG. 6, showing the junction 48A cut along a vertical plane lying slightly behind an axis of the inverted U-shaped reinforcement bracket 118A as viewed from the front end of the vehicle body 24 (FIG. 6).

As shown in FIG. 9, the first leg 125A of the reinforcement bracket 118A has the welding flange 128A joined by spot welding to the upper surface 122 (FIG. 8) of the roof side rail inner 42A (inner member 300) of the roof side rail 14. The welding flange 145 of the central web 127A of the reinforcement bracket 118A is placed flat on an upper surface of the welding flange 144 of the roof side rail inner 42A. The roof side rail 14 further includes a side rail stiffener 64 disposed between and assembled with the roof side rail outer 41A (outer member 400) and the roof side rail inner 42A for reinforcing the roof side rail 14. The side rail stiffener 64 has an integral portion forming one part of a reinforcement panel 115. The thus formed part of the reinforcement panel 115 is placed flat on an upper surface of the welding flange 145 of the reinforcement bracket 118A, and a welding flange 114 of a rear roof cross rail outer 55 (outer member 400) of the rear roof cross rail 38 is placed flat on an upper surface of the reinforcement panel 115. The welding flange 114 of the rear roof cross rail outer 55, the reinforcement panel 115, the welding flange 145 of the reinforcement bracket 118A, and the welding flange 144 of the roof side rail inner 42A are joined together by spot welding to form a four-layered spot-welded joint portion 147.

The side rail stiffener 64 is retained on the upper surface of the central web 127A of the reinforcement bracket 118A. Though not shown in FIG. 9, the side rail stiffener 64 is joined by spot welding to the central web 127A of the reinforcement bracket 118A for a purpose described later.

Furthermore, a welding flange 138 of the roof side rail outer 41A is placed flat on the upper surface of the reinforcement panel 115, and a welding flange 137 of a roof panel 36 is placed flat on an upper surface of the welding flange 138 of the roof side rail outer 41A. The welding flange 137 of the roof panel 36, the welding flange 138 of the roof side rail outer 41A, the reinforcement panel 115, and the welding flange 145 of the central web 127A of the reinforcement bracket 118A are joined together by spot welding. In this instance, the spot welding may be done in such a manner as to join together only the welding flange 137 of the roof panel 36 and the welding flange 138 of the roof side rail outer 41A. The reinforcement stay 141 has an upper end portion disposed adjacent to a nugget (or a spot-welded joint portion) between the roof panel 36, the roof side rail outer 41A, the reinforcement panel 115 and the central web 127A of the reinforcement bracket 118A.

As shown in FIG. 10, the second leg 126A of the reinforcement bracket 118A has the welding flange 131A joined by spot welding to the upper surface 123 (FIG. 8) of the pillar inner 121A (inner member 300) of the rear pillar 34. The welding flange 145 of the central web 127A of the reinforcement bracket 118A is placed flat on an upper surface of the welding flange 143 of the pillar inner 121A. The rear pillar 34 further includes a pillar stiffener 164 disposed between and assembled with the pillar outer 112A (outer member 400) and the pillar inner 121A for reinforcing the rear pillar 34. The pillar stiffener 164 has an integral portion forming another part of the reinforcement panel 115. The thus formed part of the reinforcement panel 115 is placed flat on an upper surface of the welding flange 145 of the reinforcement bracket 118A, and the welding flange 114 of the rear roof cross rail outer 55 (outer member 400) of the rear roof cross rail 38 is placed flat on an upper surface of the reinforcement panel 115. The welding flange 114 of the rear roof cross rail outer 55, the reinforcement panel 115, the welding flange 145 of the reinforcement bracket 118A, and the welding flange 143 of the pillar inner 121A are joined together by spot welding to form a four-layered spot-welded joint portion 147.

The pillar stiffener 64 is retained on the upper surface of the central web 127A of the reinforcement bracket 118A. The side rail stiffener 64 and the central web 127A of the reinforcement bracket 118A are joined by spot welding as at Ws shown in FIG. 10.

Furthermore, a welding flange 146 of the pillar outer 112A is placed flat on the upper surface of the reinforcement panel 115, and the welding flange 137 of the roof panel 36 is placed flat on an upper surface of the welding flange 136 of the pillar outer 112A. The welding flange 137 of the roof panel 36, the welding flange 1146 of the pillar outer 112A, the reinforcement panel 115, and the welding flange 145 of the central web 127A of the reinforcement bracket 118A are joined together by spot welding. In this instance, the spot welding may be done in such a manner as to join together only the welding flange 137 of the roof panel 36 and the welding flange 138 of the pillar outer 112A. The reinforcement stay 142 has an upper end portion disposed adjacent to a nugget (or a spot-welded joint portion) between the roof panel 36, the pillar outer 112A, the reinforcement panel 115 and the central web 127A of the reinforcement bracket 118A Operation of the vehicle upper body structure including the junction 48A according to the second embodiment of the present invention will be described below in conjunction with the single-sided resistance spot welding (RSW) operation.

In the one-sided RSW operation, the welding flanges 128A, 131A (FIG. 8) of the reinforcement bracket 118a are first welded to the upper surfaces 122, 123 of the roof side rail inner 42A and the pillar inner 121A, as shown in FIGS. 9 and 10. Then the pillar stiffener 164 (FIG. 10) is welded to the upper surface of the central web 127A of the reinforcement bracket 118A as at Ws (FIG. 10) and the side rail stiffener 64 (FIG. 9) is also welded to the upper surface of the central web 127 of the reinforcement bracket 118A in the same manner as the pillar stiffener 164. During that time, a reaction force acts on the central web 127A in a direction indicated by arrows "c1" and "c2" shown in FIG. 10, so that the upper surface of the central web 127A and under surfaces of the stiffeners 64, 164 are brought into close contact with each other. By us joining the stiffeners 64, 164 and the central web 127A of the reinforcement bracket 118A, it is possible to keep the reinforcement bracket 118A stably in position against rotation (as indicated by arrow "c3" shown in FIG. 10) which may otherwise occur when the welding flange 148 of the central web 127A of the reinforcement bracket 118 is later welded to the welding flanges 114, 113 of the roof side rail inner 42A and the pillar inner 121A. The spot-welded joint portion formed between each of the stiffeners 64, 164 and the central web 127A of the reinforcement bracket 118A increases the stiffness of the junction 48A of the upper vehicle body structure.

Then, a four-layered spot-welded joint portion 147 is formed between the welding flange 114 of the rear roof cross rail outer 55, the reinforcement panel 115, the welding flange 145 of the reinforcement bracket 118A and the welding flange 144 of the roof side rail inner 42A, as shown in FIG. 9, and also between the welding flange 114 of the rear roof cross rail outer 55, the reinforcement panel 115, the welding flange 145 of the reinforcement bracket 118A, and the welding flange 143 of the pillar inner 121A, as shown in FIG. 10. A downward force or pressure acting on the aforesaid four-layered parts during spot welding operation is born mainly by the stiffness of the roof side rail inner 42A and the pillar inner 112A.

Figure 11:
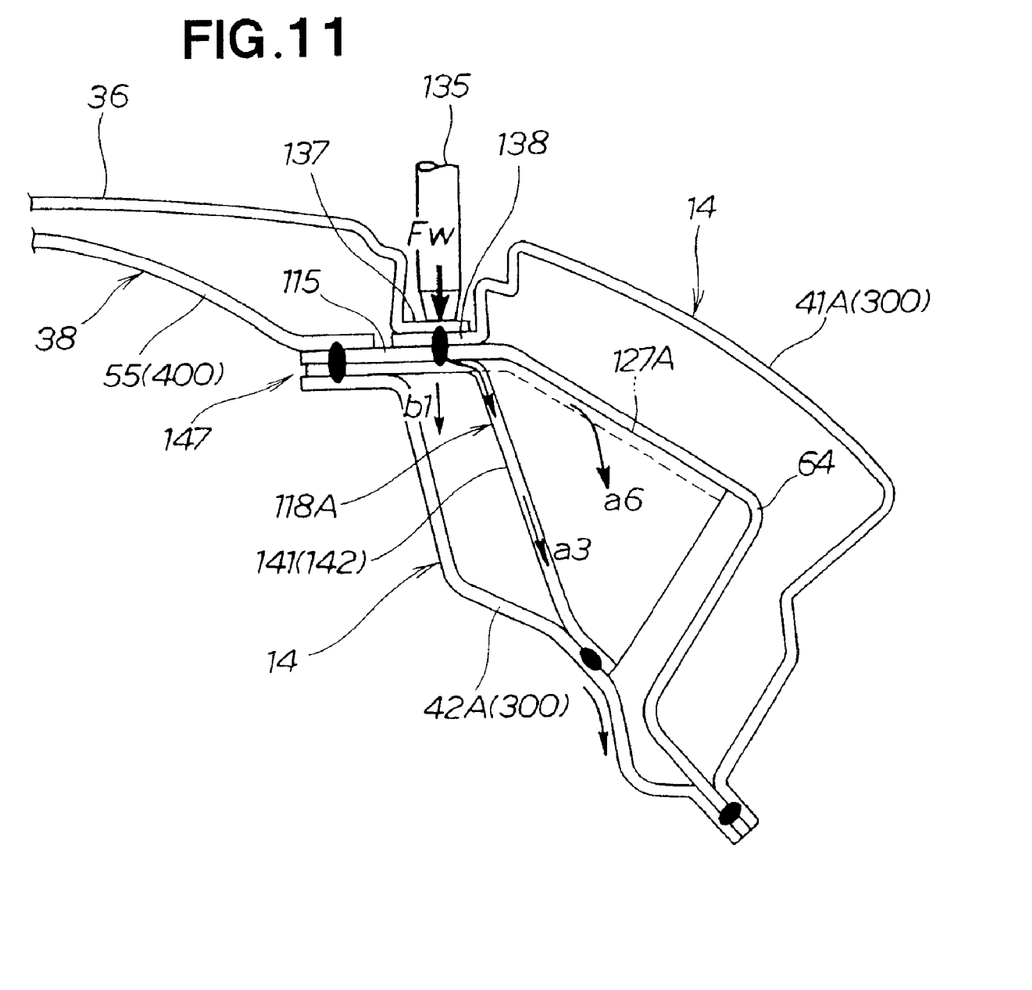
FIG. 11 is a diagrammatical view illustrative of the operation of the upper body structure when a roof panel is joined by spot welding.
Figure 12:
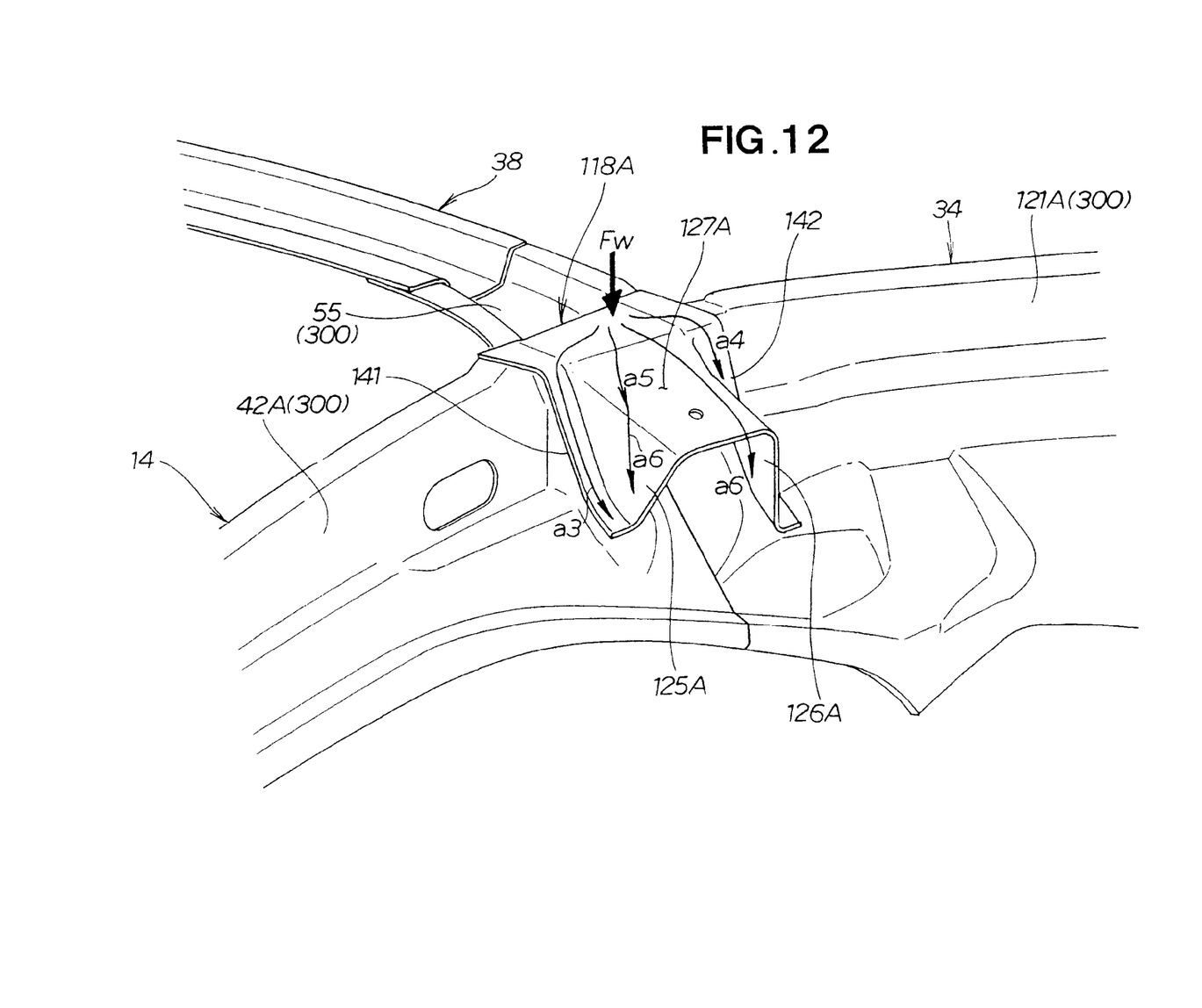
FIG. 12 is a perspective view similar to FIG. 8, showing the operation of the upper body structure.

Subsequently, as shown in FIG. 11, the welding flange 138 of the roof side rail outer 41A is placed on the upper surface of the reinforcement panel 115, and the welding flange 137 of the roof panel 36 is placed on the upper surface of the welding flange 138 of the roof side rail outer 41A. Then, a single-sided welding gun (electrode) 135 is forced at a predetermined force or pressure Fw against an upper surface of the welding flange 137 of the roof panel 36 while a ground plate or shoe (not shown) is connected to the vehicle body 24 (FIG. 7). In this instance, because the respective upper end portions of the reinforcement stays 141, 142 are each disposed adjacent to a corresponding one of the welding spots, the pressure Fw applied from the single-sided welding gun 135 is mainly retained by the reinforcement stays 141, 142 and transmitted through the reinforcement stays 141 to the roof side rail inner 42A as indicated by arrows "a3" and "a4" shown in FIGS. 11 and 12. The remaining part of the applied pressure Fw is retained by and transmitted through the central web 127A and the legs 125A, 126A of the reinforcement bracket 118a to the roof side rail inner 42A and the pillar inner 121A, as indicated by arrows "a5" and "a6" shown in FIG. 12.

The reinforcement bracket 118A provided with the reinforcement stays 141, 142 can therefore retain the reinforcement panel 115 and the welding flange 138 of the roof side rail outer 41A (FIG. 9), the welding flange 146 of the pillar inner 121A, and the welding flange 137 of the roof panel 36 stably in position against displacement and downward yielding or deformation (in the direction of arrow "b1" shown in FIG. 11) during spot welding operation.

It will be appreciated that the inverted U-shaped reinforcement bracket 118A provided with the reinforcement stays 141, 142 is able to withstand a load or pressure applied from the single-sided welding gun 135 to a weld spot. Accordingly, the reinforcement panel 115, the welding flange 138 (FIG. 9) of the roof side rail outer 41A (outer member 400), the welding flange 146 (FIG. 10) of the pillar outer 112A (outer member 400), and the welding flange 137 of the roof panel 36 can be retained stably in a weld spot without causing downward yielding or deformation during spot welding operation. This will ensure formation of good-quality nuggets at accurate weld spots, leading to an improvement in the quality of the vehicle body 24. Furthermore, since the roof side rail 14, the rear pillar 34 and the rear roof cross rail 38 are joined together at the junction 48A without requiring electrode access holes formed therein, the stiffness and strength of the vehicle body 24 do not decrease. Furthermore, since the central web 127A of the reinforcement bracket 118A is joined to the stiffeners 64, 164, the reinforcement bracket 118A is firmly retained in position against displacement. This joining structure also increases the stiffness of the junction 48A of the vehicle upper body structure.

INDUSTRIAL APPLICABILITY

With the arrangements so far described, the present invention can be used advantageously as a vehicle upper body structure assembled by the single-sided resistance spot welding technique.

The invention claimed is:
1. A vehicle upper body structure, comprising:
an inner member and an outer member assembled together to form a roof side rail, a pillar and a roof cross rail joined together at a junction, wherein the junction includes:
an inverted U-shaped reinforcement bracket having two legs and a central web extending between the legs, the legs being joined to the inner member, wherein the inverted U-shaped reinforcement bracket has an axis aligned with a widthwise direction of a vehicle body; and a reinforcement panel disposed between the inner member and the outer member and retained on an upper surface of the central web of the reinforcement bracket, the outer member being joined to an upper surface of the reinforcement panel.

2. The vehicle upper body structure according to claim 1, wherein the inverted U-shaped reinforcement bracket has an axis aligned with a longitudinal direction of a vehicle body.

3. The vehicle upper body structure according to claim 2, wherein the outer member and the reinforcement panel have a spot-welded joint portion, and either of the two legs has a base portion disposed adjacent to the spot-welded joint portion.

4. The vehicle upper body structure according to claim 3, further comprising a stiffener disposed between and assembled with the inner and outer members, wherein the reinforcement panel is formed as an integral part of the stiffener and joined to the upper surface of the central web of the reinforcement bracket.

5. The vehicle upper body structure according to claim 1, wherein the reinforcement bracket further has a pair of reinforcement stays extending along distal ends of the two legs, respectively, the reinforcement panel and the outer member have a spot-welded joint portion, and either of the reinforcement stays has an end portion disposed adjacent to the spot-welded joint portion.

6. The vehicle upper body structure according to claim 5, further comprising a stiffener disposed between and assembled with the inner and outer members, wherein the reinforcement panel is formed as an integral part of the stiffener and joined to the upper surface of the central web of the reinforcement bracket.

7. The vehicle upper body structure according to claim 1, wherein the upper member and the reinforcement panel have a spot-welded joint portion, and either of the two legs of the reinforcement bracket has a base portion disposed adjacent to the spot-welded joint portion.

8. The vehicle upper body structure according to claim 1, further comprising a stiffener disposed between and assembled with the inner and outer members, wherein the reinforcement panel is formed as an integral part of the stiffener and joined to the upper surface of the central web of the reinforcement bracket.

9. The vehicle upper body structure according to claim 1, wherein the roof side rail includes a roof side rail inner and a roof side rail outer assembled with the roof side rail inner, the pillar includes a pillar inner and a pillar outer assembled with the pillar inner, the roof cross rail includes a roof cross rail inner and a roof cross rail outer assembled with the roof cross rail inner, the roof side rail inner, the pillar inner and the roof cross rail inner forming different parts of the inner member, the roof side rail outer, the pillar outer and the roof cross rail outer forming different parts of the outer member, and wherein the legs of the reinforcement bracket are joined to the pillar inner of the pillar, the reinforcement panel is disposed between the pillar inner and the roof cross rail outer and also between the pillar inner and the roof side rail outer, and the roof cross rail outer and the roof side rail outer are joined to the upper surface of the reinforcement panel.

10. The vehicle upper body structure according to claim 9, wherein the roof side rail further includes a side rail stiffener disposed between and assembled with the roof side rail inner and the roof side rail outer, and the reinforcement panel is formed as an integral part of the side rail stiffener.

11. The vehicle upper body structure according to claim 10, wherein the reinforcement panel is joined to the upper surface of the central web of the reinforcement bracket.

12. The vehicle upper body structure according to claim 9, wherein the reinforcement panel and the roof cross rail outer have a first spot-welded joint portion, one of the legs of the reinforcement bracket has a base portion disposed adjacent to the first spot-welded joint portion, the reinforcement panel and the roof side rail outer have a second spot-welded joint portion, and the other leg of the reinforcement bracket has a base portion disposed adjacent to the second spot-welded joint portion.

13. The vehicle upper body structure according to claim 12, wherein the roof side rail further includes a side rail stiffener disposed between and assembled with the roof side rail inner and the roof side rail outer, and the reinforcement panel is formed as an integral part of the side rail stiffener.

14. The vehicle upper body structure according to claim 13, wherein the reinforcement panel is joined to the upper surface of the central web of the reinforcement bracket.

15. The vehicle upper body structure according to claim 1, wherein the roof side rail includes a roof side rail inner and a roof side rail outer assembled with the roof side rail inner, the pillar includes a pillar inner and a pillar outer assembled with the pillar inner, the roof cross rail includes a roof cross rail inner and a roof cross rail outer assembled with the roof cross rail inner, the roof side rail inner, the pillar inner and the roof cross rail inner forming different parts of the inner member, the roof side rail outer, the pillar outer and the roof cross rail outer forming different parts of the outer member, and wherein one of the legs of the reinforcement bracket is joined to the roof side rail inner, the other leg of the reinforcement bracket is joined to the pillar inner, the reinforcement panel is disposed between the roof side rail inner and the roof cross rail outer and also between the pillar inner and the roof cross rail outer, and the roof cross rail outer, the roof side rail outer and the pillar outer are joined to the upper surface of the reinforcement panel.

16. The vehicle upper body structure according to claim 15, wherein the roof side rail further includes a side rail stiffener disposed between and assembled with the roof side rail inner and the roof side rail outer, the side rail stiffener having an integral portion forming one part of the reinforcement panel, and the pillar further includes a pillar stiffener disposed between and assembled with the pillar inner and the pillar outer, the pillar stiffener having an integral portion forming another part of the reinforcement panel.

17. The vehicle upper body structure according to claim 16, wherein the reinforcement panel is joined to the upper surface of the central web of the reinforcement bracket.

18. The vehicle upper body structure according to claim 15, wherein the reinforcement bracket further has a pair of reinforcement stays extending along distal ends of the two legs, respectively, the reinforcement panel and the roof side rail outer have a first spot-welded joint portion, the reinforcement panel and the pillar outer have a second spot-welded joint portion, one of the reinforcement stays has an end portion disposed adjacent to the first spot-welded joint portion, and the other reinforcement stay has an end portion disposed adjacent to the second spot-welded joint portion.

19. A vehicle upper body structure, comprising:
an inner member and an outer member assembled together to form a roof side rail, a pillar and a roof cross rail joined together at a junction, wherein the junction includes:
an inverted U-shaped reinforcement bracket having two legs and a central web extending between the legs, the legs being joined to the inner member; and a reinforcement panel disposed between the inner member and the outer member and retained on an upper surface of the central web of the reinforcement bracket, the outer member being joined to an upper surface of the reinforcement panel, wherein the upper member and the reinforcement panel have a spot-welded joint portion, and either of the two legs of the reinforcement bracket has a base portion disposed adjacent to the spot-welded joint portion.

20. A vehicle upper body structure, comprising:

an inner member and an outer member assembled together to form a roof side rail, a pillar and a roof cross rail joined together at a junction, wherein the junction includes:

an inverted U-shaped reinforcement bracket having two legs and a central web extending between the legs, the legs being joined to the inner member; and a reinforcement panel disposed between the inner member and the outer member and retained on an upper surface of the central web of the reinforcement bracket, the outer member being joined to an upper surface of the reinforcement panel, wherein the roof side rail includes a roof side rail inner and a roof side rail outer assembled with the roof side rail inner, the pillar includes a pillar inner and a pillar outer assembled with the pillar inner, the roof cross rail includes a roof cross rail inner and a roof cross rail outer assembled with the roof cross rail inner, the roof side rail inner, the pillar inner and the roof cross rail inner forming different parts of the inner member, the roof side rail outer, the pillar outer and the roof cross rail outer forming different parts of the outer member, and wherein the legs of the reinforcement bracket are joined to the pillar inner of the pillar, the reinforcement panel is disposed between the pillar inner and the roof cross rail outer and also between the pillar inner and the roof side rail outer, and the roof cross rail outer and the roof side rail outer are joined to the upper surface of the reinforcement panel.

* * * * *